(12) United States Patent
Valadon et al.

(10) Patent No.: US 8,565,359 B2
(45) Date of Patent: Oct. 22, 2013

(54) REFINEMENT OF CHANNEL ESTIMATION WITH A BANK OF FILTERS

(75) Inventors: Cyril Valadon, Letchworth (GB); Martin Leach, Cambridge (GB); Mong S. Yee, Guildford (GB); Carlo Pachetti, Milan (IT); Mark Murphy, Cambridge (GB)

(73) Assignee: MStar Semiconductor, Inc., Grand Cayman (KY)

( * ) Notice: Subject to any disclaimer, the term of this patent is extended or adjusted under 35 U.S.C. 154(b) by 484 days.

(21) Appl. No.: 12/301,708

(22) PCT Filed: May 18, 2007

(86) PCT No.: PCT/GB2007/001861
§ 371 (c)(1),
(2), (4) Date: Aug. 26, 2009

(87) PCT Pub. No.: WO2007/135400
PCT Pub. Date: Nov. 29, 2007

(65) Prior Publication Data
US 2010/0054380 A1 Mar. 4, 2010

(30) Foreign Application Priority Data
May 22, 2006 (GB) .................................. 0610142.2

(51) Int. Cl.
*H04B 1/10* (2006.01)
(52) U.S. Cl.
USPC ............ 375/346; 375/147; 375/316; 375/354

(58) Field of Classification Search
USPC .................................. 375/354, 355, 343, 143
See application file for complete search history.

(56) References Cited

U.S. PATENT DOCUMENTS

| | | | |
|---|---|---|---|
| 6,542,562 B1 * | 4/2003 | Ostberg et al. ................. | 375/350 |
| 6,683,924 B1 * | 1/2004 | Ottosson et al. ............... | 375/343 |
| 7,269,206 B2 * | 9/2007 | Chen et al. ...................... | 375/150 |
| 2002/0042279 A1 | 4/2002 | Da Rocha et al. | |

FOREIGN PATENT DOCUMENTS

| | | |
|---|---|---|
| GB | 2276064 A | 9/1994 |
| WO | 2004/034663 A1 | 4/2004 |

OTHER PUBLICATIONS

Lohan, E.S. et al., "Novel Adaptive Filter for Fading Channel Estimation in Coherent CDMA Receivers," IEEE 2004, pp. 799-802.
Abeta, S. et al., "Adaptive Channel Estimation for Coherent DS-CDMA Mobile Radio Using Time-Multiplexed Pilot and Parallel Pilot Structures," No. XP-000904922, IEICE Trans. Commun., vol. E82-B, No. 9, Sep. 1999, pp. 1505-1513.

* cited by examiner

*Primary Examiner* — Shuwang Liu
*Assistant Examiner* — Ross Varndell
(74) *Attorney, Agent, or Firm* — Edell, Shapiro & Finnan, LLC

(57) ABSTRACT

A receiver for acquiring a signal through a propagation channel, the receiver comprising channel estimating means (200) for producing stream of CIR estimates for the channel, a plurality of doppler filtering means (201) for filtering the CIR stream in parallel and selecting means (202) for selecting the output of one of the doppler filtering means for use in recovering said signal.

16 Claims, 3 Drawing Sheets

REFINEMENT OF CHANNEL ESTIMATION WITH A BANK OF FILTERS

This application is a national phase application of International Application No. PCT/GB2007/001861.

BACKGROUND

In a typical radio system, information is modulated onto a radio carrier by a transmitter. This signal then travels via an unknown and changing environment to the receiver. The ability to estimate the characteristics of this propagation environment and to mitigate the impact on the received signal is often key to the performance of a receiver.

FIG. 1 depicts various processing stages that form part of such an approach. It should be noted that the blocks shown in FIG. 1 represent processing operations performed on a received signal but do not necessarily correspond directly to physical units that may appear within a practical implementation of a receiver. The first stage 101 corresponds to the radio frequency processing. During the radio frequency processing, the received signal is down-converted to base-band using a mixer 103. The reference frequency used to drive the mixer is generated by an oscillator 104. Following this carrier down-conversion, the signal is low-pass filtered 102 and then passed to the mixed-signal processing stage 108. The mixed signal processing includes Analogue-to-Digital Conversion (ADC) 105, sampling 106 and low pass filtering 107. The resulting signal, which is now digital, is supplied to the digital signal processing stage 111 where it is processed such that the transmitted information can be recovered. The received signal is first processed by the channel estimation unit 109 where an estimate of the Channel Impulse Response (CIR) is generated. This estimated CIR is processed in combination with the received signal by the demodulation unit 110 such that the sequence of transmitted bits can be recovered.

In the downlink of cellular communication systems, a pilot signal is usually transmitted in combination with the information bearing signals such that the receiver can estimate the propagation channel. For Wideband Code-Division Multiple Access (W-CDMA) schemes, this pilot signal is typically code-multiplexed with the transmitted signal. For example, in the 3GPP standard, the Common Pilot Channel (CPICH) is a sequence of known bits which are modulated, spread and added to the downlink signal (3*GPP TS 25.211; Technical Specification Group Radio Access Network; Physical channels and mapping of transport channels onto physical channels (FDD)*). At the receiver, it is possible to generate an estimate of the CIR by correlating the received signal with the known CPICH pilot sequence.

The accuracy of the channel estimation process is crucial in determining the quality of the demodulation process. For W-CDMA systems, it is typical to use a Rake architecture at the receiver (*CDMA—Principles of Spread Spectrum Communication*, Andrew J Viterbi, *Addison-Wesley Wireless Communications Series*). In the Rake receiver, the weights associated with the different fingers correspond to the estimated CIR taps at the finger delay locations. The noise affecting these finger weights increases the likelihood of errors in the demodulation process. More recently, new receiver architectures have been introduced where the demodulation accuracy is improved at the expense of the implementation complexity. The Linear Minimum Mean Square Error (LMMSE) equaliser is an example of such an architecture (*Chip-Level Channel Equalization in WCDMA Downlink*, K Hooli, M. Juntti, M. J Heikkila, P. Komulainen, M. Latva-aho, J. Lilleberg, *EURASIP Journal on Applied Signal Processing*, August 2002). The LMMSE equaliser improves the performance of the demodulation unit by mitigating the distortions introduced by the propagation channel. The LMMSE equaliser can be implemented using a pre-filter Rake architecture (*Equalization in WCDMA terminals*, Kari Hooli, PhD thesis, 2003) where the conventional Rake receiver is preceded by a linear filter which aims at removing the Inter-Symbol Interference (ISI) introduced by the channel. In the pre-filter Rake receiver, the channel estimates are used both to set the weights of the Rake receiver as well as to derive the coefficients of the linear pre-filter. Hence, noise in the channel estimation process will significantly degrade the receiver performance.

High-Speed Downlink Packet Access (HSDPA) is an evolution of the Release 99 version of the 3GPP standard aimed at providing improved user experience through increased data rates and reduced end-to-end latency. These improvements are delivered through a combination of Incremental Redundancy (IR) and the use of higher-order modulation schemes. HSDPA extends the capabilities of 3GPP by introducing the use of the 16QAM modulation for the data bearing channels. Compared to the QPSK modulation scheme used in 3GPP, 16QAM is more sensitive to errors in the estimation of the amplitude of the channel. Hence, accurate channel estimation is important to the performance of an HSDPA receiver.

As indicated earlier, it is possible in a W-CDMA system for the receiver to estimate the CIR by correlating the received signal with the known pilot signal. It should however be stressed that the estimated CIR will be degraded by noise and interference. The signals transmitted to the different users in the system, both in the same cell as the user of interest and adjacent cells, will generate an increased level of noise in the channel estimates. The noise level in the channel estimates is determined by the properties of the cross-correlation between the pilot signal and the other user signals. Even in the absence of interfering signals from other users present in the system, the channel estimation process will suffer from self-interference generated by the non-perfect properties of the pilot signal auto-correlation.

The present application presents a number of techniques that can be used to improve the accuracy of the channel estimates.

The period at which channel estimates can be generated depends on the format of the pilot signal being used. For example, in the 3GPP standard, it is possible to generate a new set of channel estimates for every new 512 chips. It should however be noted that variations in the channel estimates generated at each update period will depend on the propagation environment, specifically the Doppler frequency of the channel. When the User Equipment (UE) is moving slowly in the system, successive channel estimates are heavily correlated. It is therefore possible to improve the channel estimates by filtering them across multiple update periods. Such an approach has already been proposed in '*Adaptive Filtering for Fading Channel Estimation in WCDMA Downlink*, Petri Komulainen and Ville Haikola'. In order to achieve good performance, it is important to match the characteristics of the filter applied to the channel estimates to that of the propagation environment. In '*Adaptive Filtering for Fading Channel Estimation in WCDMA Downlink*, Petri Komulainen and Ville Haikola', this is achieved by using a filter where coefficients are adapted to the channel characteristics using the Least Mean Square (LMS) algorithm.

SUMMARY OF THE INVENTION

According to one aspect of the present invention, multiple filters are applied in parallel to the channel estimates. The output of one of these filters may then be selected, for example based on the Doppler characteristics of the channel. By so doing, a filter adaptation loop may be omitted. A mechanism to decide which set of filter outputs should be selected is also described in the present application.

The use of filtering on the channel estimates may reduce the power of the estimation noise and increase the accuracy of the estimated CIR. However, noise is always present in the estimated values. Hence, the present invention provides non-linear scaling that may be applied to the filtered channel estimates in order to further reduce the estimation noise.

The present invention relates to channel estimation architecture aimed at improving the accuracy of the channel impulse response estimation.

In the proposed architecture, initial channel estimates may be generated through correlation between the received signal and the known pilot sequence. In case of transmit diversity, a set of initial channel estimates may be generated for each of the transmit antennas. These initial channel estimates may then be passed through a set of different filters having different frequency responses. The output of the filter providing the best accuracy for the channel estimates may then be selected for further processing. The different filters can be run continuously, such that the state associated with each of these filters is always correct. Hence, when the propagation conditions change and a different one of the filters needs to be selected, it is not then necessary to wait for the group delay of the filter in order to get valid data. Moreover, the different filters can be fixed, such that there is no need for a complex filter adaptation mechanism.

A mechanism and scheme for deciding which filter output should be used for further processing provides a further aspect of the present invention. The propagation conditions may be estimated using the raw channel estimates and a decision on the most suitable filter may be made accordingly. (In the case of transmit diversity, multiple sets of channel estimates are generated, each set for a different transmit antenna. However, the filter selection mechanism may be arranged to operate always on the channel estimates from a particular antenna, thus reducing the implementation complexity.) The propagation conditions can be assessed from propagation metrics derived in the following manner. The power of each of the taps within a raw channel estimate (i.e. as supplied to the group of parallel filters) can be estimated and the maximum power tap identified. The value of that tap may then be correlated with delayed versions of that tap's value and the results of those correlations can be used as the propagation metrics.

A non-linear scaling mechanism/scheme for application to the filtered channel estimates provides a further aspect of the present invention. The scaling to be applied to the different channel estimates can be based on knowledge, or the estimation, of the power of the noise in the filtered channel estimates. This noise power estimation may be performed by combining the received signal power with the knowledge of the selected filter.

Since the different filters are designed to match different propagation conditions, it is likely that their associated group delay values will be different. Hence, in the proposed architecture, it is possible in accordance with a yet further aspect of the invention to use a group delay line or element, controlled by the filter selection apparatus, in order to guarantee fixed delay in the channel estimation process.

As indicated earlier, a number of different filters may be applied to the channel estimates. Such an approach is useful because the states of the different filters are always correctly populated, thus ensuring a correct transition from utilising the output of one filter to utilising the output of another when the propagation conditions vary. Similarly, a mechanism/scheme for coping with changes in the timing of the receiver is provided in accordance with a yet further aspect of the invention. When the receiver timing is modified, for example to track changes in the channel, the states of the different filters may be updated to match the current conditions. In accordance with this aspect of the invention, a scheme for adjusting a channel estimate filter may be provided as follows. When the receiver timing dictates that the channel estimate tap values are shifted (either forward or backward), then the states of the filters operating on those tap values undergo a commensurate shift to ensure that the tap values remain aligned with their filter states. An approach used to initialise the filter states for timing positions where no prior information is available is also presented in this application.

The present application describes a receiver architecture where the accuracy of a set of initial channel estimates is improved through a number of signal processing stages. The techniques described in this document can be applied to any digital communication systems where channel estimation needs to be performed. Their application is not limited to any specific multiple access scheme nor to any specific transmission format. It should also be noted that the proposed receiver architecture covers both single antenna and multiple antenna link scenarios (at both the transmission and reception side). The proposed receiver architecture can operate in conjunction with any technique used to derive the initial set of channel estimates.

The channel estimation apparatus can be realised in hardware, software on a processor, or a combination thereof.

BRIEF DESCRIPTION OF THE DRAWINGS

By way of example only, certain embodiments of the invention will now be described in more detail with reference to the accompanying drawings, in which.

DETAILED DESCRIPTION

In order to describe in detail embodiments of the proposed architecture, it is first required to present the model of the transmission link that will be used.

The received signal can be expressed as $$r(k) = \sum_{l=0}^{L} h(l)c(k-l) + \sum_{l=0}^{L} h(l)s(k-l) + \zeta(k)$$

where $\{h(k)\}_{k \in \{0, \ldots, L\}}$ represent the different propagation channel taps. $\zeta(k)$ models the combination of thermal noise and interference from adjacent cells. $\zeta(k)$ is assumed to be Additive White Gaussian Noise (AWGN) with variance equal to $\sigma^2$. The samples $c(k)$ denote the transmitted pilot sequence and $s(k)$ is used to represent the other signals from the different users in the serving cell.

It is assumed in the rest of the document, without any loss of generality, that $$\alpha = \frac{1}{N}\sum_{k=0}^{N-1}|c(k)|^2.$$

The CIR is derived by correlating the received signal with the pilot sequence $$\hat{h}(l) = \frac{1}{N}\sum_{k=0}^{N-1} r(k)c^*(k-l)$$

where N is the spreading factor of the W-CDMA pilot signal.

This correlation can be shown to be made of 4 terms $$\hat{h}(l) = \alpha \times h(l) + \frac{1}{N}\sum_{\substack{m=0 \\ m \neq l}}^{L} h(m) \sum_{k=0}^{N-1} c(k-m)c^*(k-l) \quad \text{(A)}$$

$$+ \frac{1}{N}\sum_{\substack{m=0 \\ m \neq l}}^{L} h(m) \sum_{k=0}^{N-1} s(k-m)c^*(k-l) \quad \text{(B)}$$

$$+ \frac{1}{N}\sum_{k=0}^{N-1} \zeta(k) \times c^*(k-l) \quad \text{(C)}$$

The first term in the above equation corresponds to the actual channel tap value scaled by the power of the pilot signal. The additional three terms represent the noise generated in the estimation process.

The first noise term (A) corresponds to the pilot ISI. The power of this noise term depends on the propagation channel and on the auto-correlation properties of the pilot signal.

The second noise term (B) corresponds to interference from other signals transmitted in the serving cell. The level of the interference noise depends on both the power of the other user signals and on the properties of the cross-correlation between the pilot signal and the modulated spreading sequences associated with the other user signals.

The last term (C) represents the thermal noise power.

The above equation can be re-written as follows $$\hat{h}(l) = \alpha \times h(l) + \sum_{\substack{m=0 \\ m \neq l}}^{L} h(m)\gamma(m-l) + \frac{1}{N}\sum_{k=0}^{N-1}\zeta(k) \times c^*(k-l)$$

where $\gamma$ represents the cross-correlation between the pilot sequence and the received sequence $$\gamma(m-l) = \frac{1}{N}\sum_{k=0}^{N-1} t(k-m)c^*(k-l)$$

and $t(k)=c(k)+s(k)$ denotes the signal transmitted by the serving cell.

The above equations for the derivation of the channel estimates have been obtained assuming that the signal is received at one sample per chip. The model can easily be extended to the case where the signal is over-sampled by correlating the pilot signal against the different possible phases within one chip of the received signal.

Figure 1:
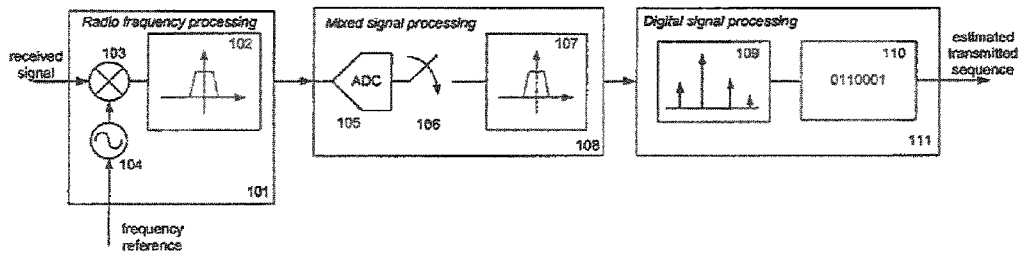
FIG. 1 presents a typical receiver where the channel estimation architecture is used.
Figure 2:
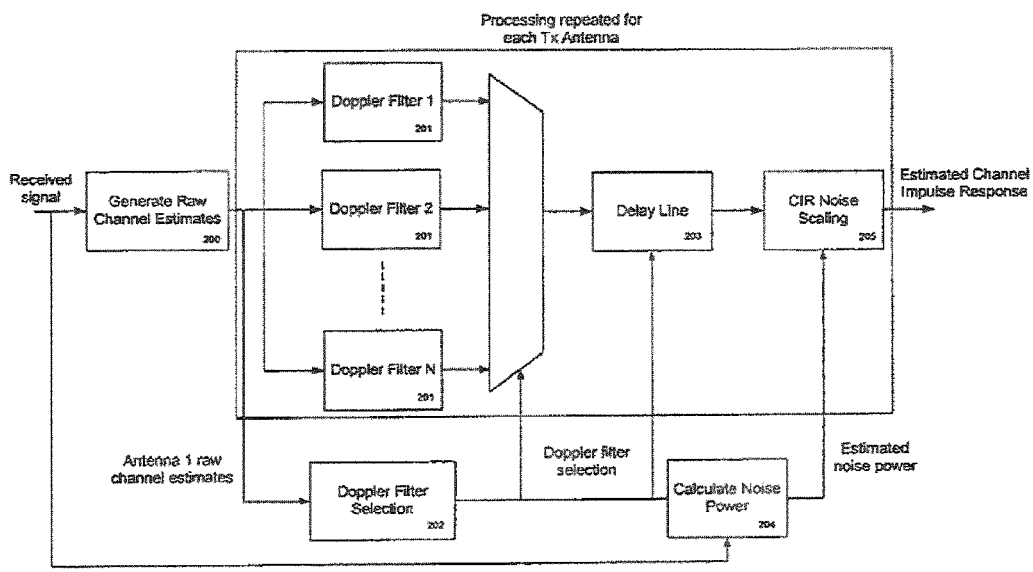
FIG. 2 presents the channel estimation processing stages.

These equations show that the channel estimates generated by correlating the received signal with the pilot sequence suffer from noise and interference. The channel estimation structure described in this document aims at reducing the level of the noise and interference signals present in the channel estimates. The different processing stages implemented in the proposed architecture are presented in FIG. 2.

The received signal is first processed by unit 200 in order to generate raw channel estimates. These initial channel estimates can be generated, for example, by correlating the received signal with the known pilot sequence as described in the above equations. It should however be noted that the application of the present invention is not restricted to this case. It would be possible to use other techniques, such as linear Least-Square fitting (*Digital Communications*, John G. Proakis, $2^{nd}$ edition, McGraw-Hill International, in order to derive these channel estimates. In case of transmit diversity, either open-loop or closed-loop, the unit 200 will generate a set of initial channel estimates for each transmit antenna.

Figure 4:
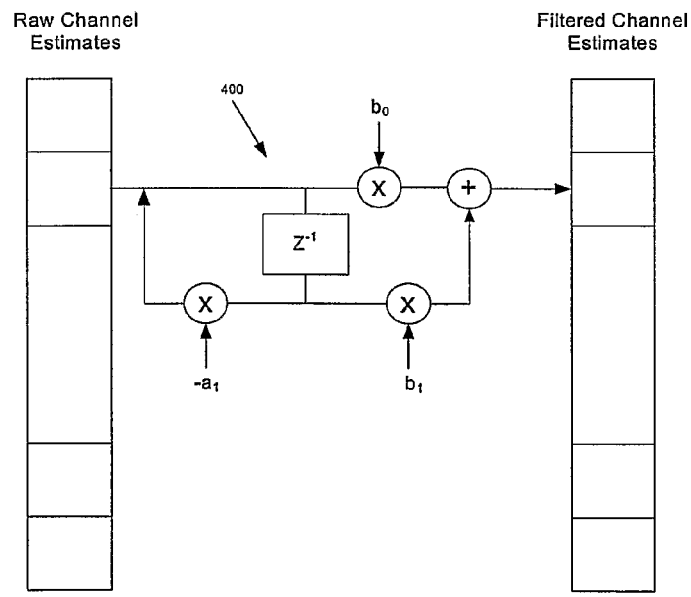
FIG. 4 presents one possible implementation of the Doppler filters.

The initial channel estimates are then processed by a bank of N different Doppler filters 201. The Doppler filters are designed to match different propagation channel conditions. Typically the different filters will be low-pass filters and the bandwidth of each filter will be optimised for a given Doppler frequency condition of the channel. It should be noted that each filter could be implemented using a number of different architectures. It is possible, for example, to use either a Finite Impulse Response (FIR) or an Infinite Impulse Response (IIR) implementation of the filter. It should also be noted that it is not required that the different filters in the bank of N filters are implemented using the same architecture. FIG. 4 presents one possible implementation of the Doppler filter unit 201. In this specific implementation, a single pole IIR filter structure has been selected. For a given Doppler filter 201, the filtering presented in FIG. 4 needs to be performed for each of the L+1 channel taps. This implies that L+1 memory elements 400 are required for the implementation presented in FIG. 4.

In case of transmit diversity, the raw channel estimates for each of the two transmit antennas need to be processed by the N different filters in the filter bank. This can be implemented by using 2N filters where filters are designed in pairs.

In the implementation of the Doppler filter presented in FIG. 4, each Doppler filter requires L+1 memory elements in order to store the state of the filter. Each memory element in a given filter stores the state of the filter for a specific channel tap position. The timing of the received signal may however be modified. This can be the case, for example, when new paths appear in the propagation environment and the sample acquisition is advanced/delayed in order to track these new paths. In such a case, the raw channel estimates are shifted in time. If the filter states are not modified, the raw channel estimates fed to the Doppler filter are not aligned anymore with the contents of the delay elements 400. This would lead to a significant performance degradation. In order to avoid such performance degradation, the following approach is proposed. When the timing of the received signal is modified, the memory elements in the different Doppler filters are moved so as to be aligned with the new raw channel estimates. For example, if the received signal is delayed by twice the channel estimation timing resolution, the Doppler filter memory states need to be moved by two positions (i.e. the state associated with filtered channel tap $\hat{h}(k)$ now needs to be associated with channel tap $\hat{h}(k+2)$). It should be noted that this operation can easily be performed without the need to physically copy the contents of the different memory elements 400. This can be achieved by implementing an indirect indexing scheme for the different memory elements. In such a case, it is sufficient to add an offset to this indexing scheme in order to take into account any change in the receiver timing.

When such a timing change is performed, raw channel estimates are generated for timing positions where no previous history is available. For example, if the received signal is delayed by twice the channel estimation timing resolution, the first two channel estimates do not have any previous history. It is then required to wait for the Doppler filter history to be generated in order to get valid filtered channel estimates. Hence, a delay equal to the group delay of the Doppler filter is introduced in the generation of the filtered channel estimates. This will however introduce a penalty in terms of performance. In order to avoid incurring this performance loss, the following mechanism can be implemented. When a timing change is performed, the positions corresponding to timing positions with no previous channel estimation history are indicated as being invalid. When raw channel estimates then become available, possibly at the next channel estimation period, the memory elements 400 for tap positions flagged as being invalid are initialised using the raw channel estimate values.

Each Doppler filter (201) in the filter bank generates a set of filtered channel estimates. Hence, N sets of channel estimates are available at the output of the filter bank (mN channel estimates in case of m antennae transmit diversity). However, the channel estimation unit (109) should only generate one set of channel estimates for further processing. Hence, the set of channel estimates to be used for further processing needs to be selected from the N possible sets. The selection is performed by unit 202. The filter selection unit 202 operates on the raw channel estimates and is presented in FIG. 3. A detailed description of the filter selection unit 202 is provided later. It can however be noted that even in case of transmit diversity where multiple sets of raw channel estimates are generated, the filter selection unit only operates on the channel estimates from the first antenna. Such an approach has been selected in order to reduce the implementation complexity of the channel estimation receiver.

Figure 5:
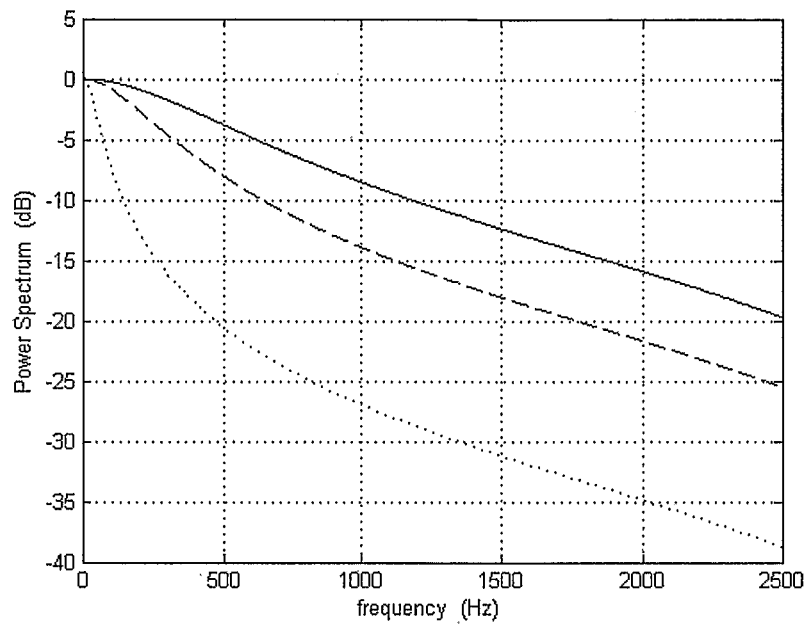
FIG. 5 presents the power frequency response of 3 possible Doppler filters.
Figure 6:
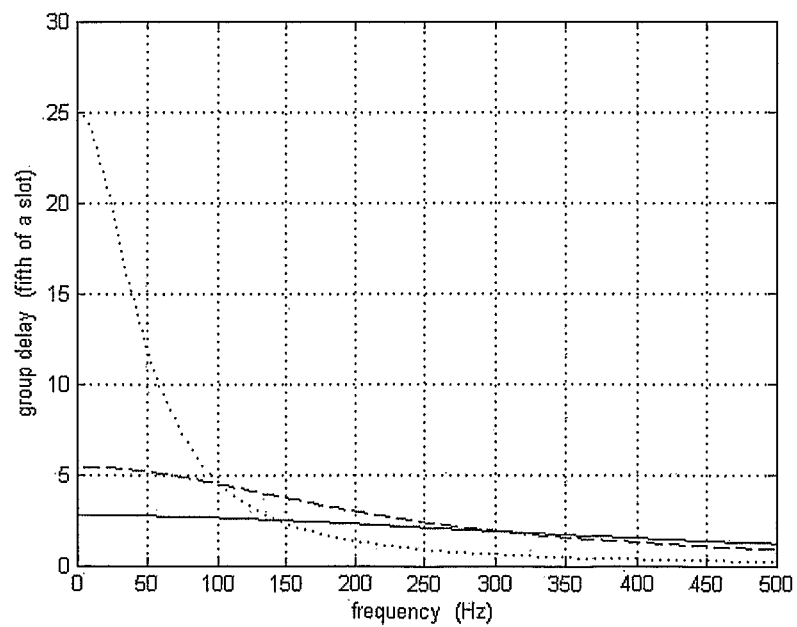
FIG. 6 presents the group delay response of 3 possible Doppler filters.

The different Doppler filters are designed to match different Doppler propagation conditions. Hence, the different filters have different amplitude and phase responses in the frequency domain. FIG. 5 and FIG. 6 present the power frequency response and the group delay frequency response of 3 different Doppler filters that could be used in a W-CDMA receiver following the 3GPP standard. It can be seen from FIG. 6 that the group delay response of the different filters significantly varies with the filter being used. Hence, the delay in the generation of the channel estimates will vary according to the Doppler filter selection. In order to achieve good performance in the demodulation unit 110, it is usually beneficial to align in time the channel estimates with the data samples being processed. This time alignment of the channel estimates with the received samples will depends on the group delay through the Doppler filter selected by unit 202. Since the group delay in the channel estimation is not fixed, the time alignment of the received samples with the channel estimates would require processing the received signal differently depending on the Doppler filter selection. In order to avoid this, a variable delay line 203 can be used in the channel estimation. The delay introduced on the channel estimates is controlled by the results of the Doppler filter selection unit. The delay introduced should be such that the overall delay through the selected Doppler filter and through the delay line is constant across all the Doppler filters. It should be noted that the implementation of the variable delay through the delay line can easily be achieved by using pointers in a buffer and modifying the position of the read pointers. As indicated before, in the absence of the delay line, the channel estimates may not be aligned with the received samples, leading to a potential performance degradation. The significance of the performance degradation depends on the rate of change of the channel estimates. Hence, in some conditions it may be possible to avoid the implementation of the variable delay line on the channel estimates.

Once the channel estimates have been processed by the delay line, a non-linear scaling (205) is applied in order to improve their accuracy. If we denote the filtered channel estimates as $\{\tilde{h}(k)\}_{k \in \{0,\ldots,L\}}$, the channel estimates after the scaling unit 205 can be expressed as $$\hat{h}(k) = f(\tilde{h}(k), \sigma_c^2)$$

where $\sigma_c^2$ is the power of the noise in the filtered channel estimates.

In one possible implementation of the CIR noise scaling 205, the function $f$ can be expressed as $$\hat{h}(k) = f(\tilde{h}(k), \sigma_c^2) = \tilde{h}(k) \times \frac{|\tilde{h}(k)|^2}{|\tilde{h}(k)|^2 + \sigma_c^2} = \tilde{h}(k) \times \frac{1}{1 + \frac{\sigma_c^2}{|\tilde{h}(k)|^2}}$$

The power of the noise in the channel estimates $\sigma_c^2$ is estimated in unit 204 from the received signal and the results of the Doppler filter selection unit 202.

In one possible implementation, the power of the channel estimation noise is derived as follows $$\sigma_c^2 = \frac{1}{M} \sum_{k=0}^{M-1} |r(k)|^2 \times \lambda \times \beta$$

The first term in the above equation, $$\frac{1}{M} \sum_{k=0}^{M-1} |r(k)|^2,$$

corresponds to the power of the received signal over the channel estimation period. M denotes the number of received samples corresponding to the generation of one single set of channel estimates. The second term in the above equation $\lambda$ depends on the auto-correlation and cross-correlation properties of the different modulated spreading sequences. In order to simplify the implementation of the noise power estimation unit 204, it is possible to make the following simplification $$\lambda \approx \frac{1}{N}$$

where N is the spreading factor of the pilot sequence.

The last term in the noise power calculation equation, $\beta$, indicates that the power of the noise is reduced during Doppler filtering 201. Hence the value of $\beta$ depends on the Doppler filter selected by unit 202. Each Doppler filter will have a different value of $\beta$ associated with it and the correct value needs to be used in the noise power estimation based on the results of the Doppler filter selection. For a given Doppler filter 201, the value of β can be derived from the frequency response of the filter and from the knowledge of the spectrum of the noise. The value of β can then be calculated as the ratio between the power of the noise at the output of the Doppler filter and the power of the noise at the input of the Doppler filter. It is usually possible to assume the noise to be white.

If the spreading sequences of the different user signals are orthogonal when the signals are time-aligned, it is possible to improve the accuracy of the CIR noise scaling process. In this case, the different user signals at the time position corresponding to the tap being estimated do not generate any interference. It is therefore possible to modify the implementation of 205 such that the CIR noise scaling is performed as follows $$\tilde{h}(k) = f(\hat{h}(k), \sigma_c^2) = \hat{h}(k) \times \frac{1}{1 + \left(\frac{\sigma_c^2}{|\hat{h}(k)|^2} - (\lambda \times \beta)\right)}$$

Figure 3:
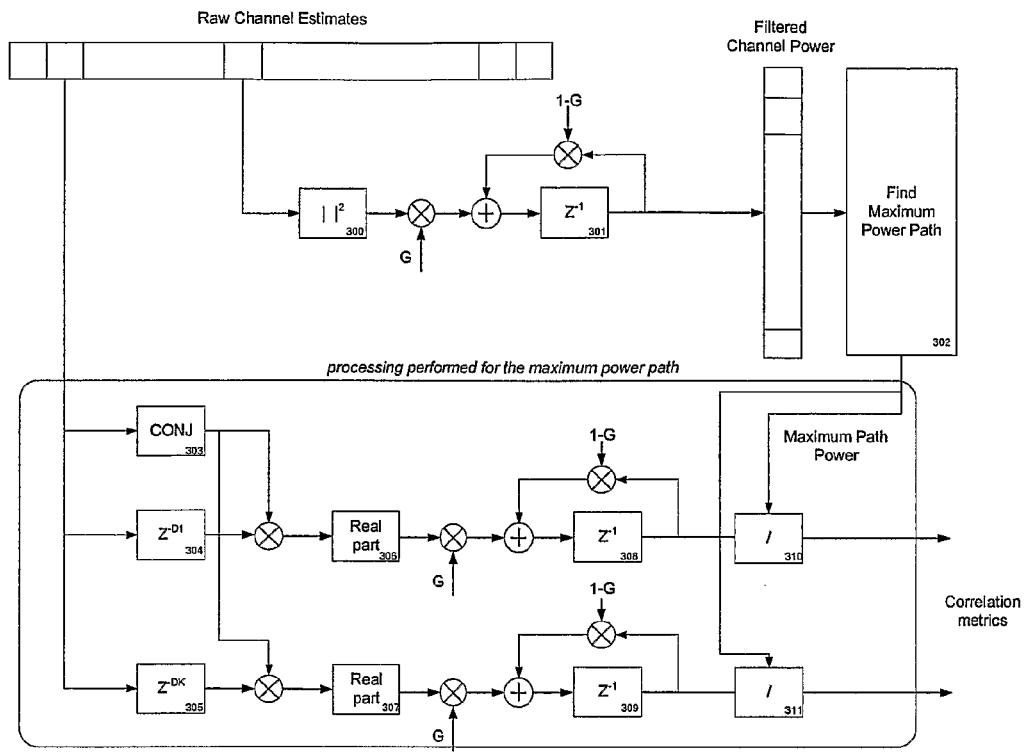
FIG. 3 presents the processing stages performed to calculate the raw channel estimates' correlation metrics.

The processing performed by the Doppler filter selection unit 202 will now be described in details. The different components of this unit are presented in FIG. 3. The power of the raw estimated channel taps are calculated in unit 300, which assesses in turn each tap position in the raw channel estimate. These channel power values are then passed through a low-pass filter. In FIG. 3, the low-pass filter is implemented as an IIR with a single memory element 301. It should however be stressed that it would be obvious for someone skilled in the art to modify this part of the system and to use a different architecture for the low-pass filter. Once the power of all the raw channel estimates have been calculated and filtered, unit 302 finds the maximum power path and returns the corresponding path index and channel power. The rest of the processing is then performed only for the maximum power path. For the maximum power path, the channel estimates are first complex-conjugated in unit 303. Parallel to this processing, the estimated channel tap is passed through K different delay lines. To simplify FIG. 3, only two delay elements 304 and 305 are shown, which implement delays D1 and DK respectively. K different complex products are then calculated between the complex conjugate of the estimated channel tap and the K different delayed versions. The real part for each of these products is then calculated in units 306 and 307. It should be noted that the resulting quantities correspond to the auto-correlation of the channel tap calculated for K different delays. These correlation values are then processed by low-pass filters. As an example, in FIG. 4, the different low-pass filters are implemented as single pole IIRs with single memory elements 308 and 309. It should be noted that the frequency response of the filters applied to the correlation values should be identical to that of the filter applied to the channel tap power (i.e. the filter comprising memory element 301). Each filtered correlation value is then divided in units 310 and 311 by the maximum path power estimated in 302. These normalised correlation metrics are then used to select the Doppler filter which output will be used for the output. The selection of the Doppler filter can be made, for example, by comparing these correlation metric values against a set of different thresholds.

Because the N different Doppler filters are always run on the raw channel estimates, valid filtered versions of the channel estimates are always available for the different Doppler conditions. Hence, the modification of the Doppler filter output selected by unit 202 does not introduce any delay in the generation of the filtered channel estimates. If a single configuration of the Doppler filter was used and adapted to the channel conditions, a delay would have to be suffered when Doppler conditions are modified. This is not the case with the proposed approach.

The invention claimed is:

1. A receiver for acquiring a signal through a propagation channel,
the receiver comprising:
channel estimating means for producing a stream of channel impulse response (CIR) estimates for the channel;
a plurality of filtering means for filtering the CIR stream in parallel, each of the plurality of filtering means filtering the stream of CIR estimates for the channel;
selecting means for selecting an output of one of the plurality of filtering means for use in recovering said signal; and
delay means for applying a delay, the same as a timing change when a receiver timing of the signal is modified, to the selected filtering means output,
wherein said delay is adjustable in order to at least attempt to synchronize a timing relationship between the receiver timing of said signal and the output timing of the selected filtering means output irrespective of which of the plurality of filtering means has been selected to provide the selected filtering means output.

2. A receiver according to claim 1, wherein the selecting means is operable to select the output of one of the filtering means by reference to inputs of the plurality of filtering means.

3. A receiver according to claim 1, further comprising:
scaling means for scaling the selected filtering means output;
wherein the scaling applied to a CIR estimate in said output is dependent upon the noise power in the channel estimates in that CIR estimate.

4. A receiver according to claim 1, wherein timing adjustments can cause the channel estimate values within a CIR estimate to shift in time relative to the channel estimate values in the preceding CIR estimate in said stream and at least one of the filtering means is arranged to apply a corresponding shift to its internal state to maintain alignment between the internal state and channel estimate values in CIR estimates arriving at the respective filtering means.

5. A receiver according to claim 4, wherein if a shift to the internal state of a filtering means creates an invalid entry in an element in said state, then an output of said filtering means corresponding to that element is deemed invalid until said filtering means performs sufficient cycles to produce a valid entry for said element.

6. A receiver according claim 1, further comprising:
assessment means for assessing the performance of the plurality of filtering means to provide metrics to guide the operation of the selection means;
wherein the assessment means is arranged to identify the position of the maximum power channel estimate value in a CIR estimate and correlate the channel estimate value at that position with a channel estimate value that previously appeared at that position.

7. A receiver for acquiring a signal through a propagation channel,
the receiver comprising:
channel estimating means for producing a stream of channel impulse response (CIR) estimates for the channel; and filtering means for filtering the CIR stream, the filtering means comprising a bank of Doppler filters arranged in parallel with one another, each of the Doppler filters filtering the stream of CIR estimates for the channel and, timing adjusting means for causing channel estimates within a CIR estimate to shift in time relative to channel estimate values in the preceding CIR estimate in said CIR stream;

wherein, the Doppler filters are arranged to apply a corresponding shift to internal states of the Doppler filters to maintain alignment between the internal states of the Doppler filters and channel estimate values in CIR estimates arriving at the Doppler filters.

8. A receiver according to claim 7, wherein if a shift to the internal state of the Doppler filters creates an invalid entry in said state, then an output of said Doppler filter corresponding to that element is deemed invalid until said Doppler filter performs sufficient cycles to produce a valid entry for said element.

9. A method for acquiring a signal through a propagation channel, the method comprising:

producing a stream of channel impulse response (CIR) estimates for the channel;

filtering the CIR stream in parallel using a plurality of filtering means each including a Doppler filter, each of the filtering means filtering the stream of CIR estimates for the channel;

selecting an output of one of the plurality of filtering means for use in recovering said signal; and applying a delay, the same as a timing change when a receiver timing of the signal is modified, to the selected filtering means output;

wherein said delay is adjustable in order to at least attempt to synchronize a timing relationship between the receiver timing of said signal and the output timing of the selected filtering means output irrespective of which of the plurality of filtering means has been selected to provide the selected filtering means output.

10. A method according to claim 9, wherein the output of one of the filtering means is selected by reference to inputs of the plurality of filtering means.

11. A method according to claim 9, the method further comprising:

scaling the selected filtering means output;

wherein the scaling applied to a CIR estimate in said output is dependent upon the noise power in the channel estimates in that CIR estimate.

12. A method according claim 9, wherein timing adjustments can cause the channel estimate values within a CIR estimate to shift in time relative to the channel estimate values in the preceding CIR estimate in said stream, the method further comprising applying a corresponding shift to an internal state of at least one of the filtering means to maintain alignment between the internal state and channel estimate values in CIR estimates arriving at the respective filtering means.

13. A method according to claim 12, wherein if a shift to the internal state of a filtering means creates an invalid entry in an element in said state, then an output of said filtering means corresponding to that element is deemed invalid until said filtering means performs sufficient cycles to produce a valid entry for said element.

14. A method according to claim 9, the method further comprising:

assessing the performance of the plurality of filtering means to provide metrics to guide the selection of the output of one of the filtering means;

wherein assessing the performance of the plurality of filtering means comprises identifying the position of the maximum power channel estimate value in a CIR estimate and correlating the channel estimate value at that position with a channel estimate value that previously appeared at that position.

15. A method for acquiring a signal through a propagation channel, the method comprising:

producing a stream of channel impulse response (CIR) estimates for the channel; and filtering the CIR stream using filtering means, wherein the filtering means comprises a bank of Doppler filters arranged in parallel with one another, each of the Doppler filters filtering the stream of CIR estimates for the channel and, timing adjusting means for causing channel estimates within a CIR estimate to shift in time relative to channel estimate values in the preceding CIR estimate in said CIR stream, and applying a corresponding shift to internal states of the Doppler filters to maintain alignment between the internal states of the Doppler filters and channel estimate values in CIR estimates arriving at the Doppler filters.

16. A method according to claim 15, wherein if a shift to the internal state of the Doppler filters creates an invalid entry in said state, then an output of said Doppler filter corresponding to that element is deemed invalid until said Doppler filter performs sufficient cycles to produce a valid entry for said element.

* * * * *